United States Patent [19]
Goodridge et al.

[11] Patent Number: 5,799,297
[45] Date of Patent: *Aug. 25, 1998

[54] TASK WORKFLOW MANAGEMENT SYSTEM AND METHOD INCLUDING AN EXTERNAL PROGRAM EXECUTION FEATURE

[75] Inventors: Gilbert W. Goodridge, Lexington, S.C.; Michael J. Komichak, Alexandria, Va.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 572,928

[22] Filed: Dec. 15, 1995

[51] Int. Cl.⁶ .................................................. G06F 17/30
[52] U.S. Cl. .......................... 707/1; 707/100; 707/10; 707/104
[58] Field of Search ................................. 395/601, 611, 395/650, 207, 182.14; 364/401, 488; 707/1, 100, 10, 104

[56] References Cited

U.S. PATENT DOCUMENTS

| | | | |
|---|---|---|---|
| 5,301,320 | 4/1994 | McAtee et al. | 395/650 |
| 5,319,543 | 6/1994 | Wilhelm | 364/401 |
| 5,392,220 | 2/1995 | Van den Hamer et al. | 364/488 |
| 5,446,740 | 8/1995 | Yien et al. | 370/110.1 |
| 5,530,861 | 6/1996 | Dramant et al. | 395/650 |
| 5,551,028 | 8/1996 | Voll et al. | 707/104 |
| 5,553,234 | 9/1996 | Cotner et al. | 395/182.14 |
| 5,630,069 | 5/1997 | Flores et al. | 395/207 |
| 5,680,615 | 10/1997 | Marlin et al. | 707/103 |
| 5,696,961 | 12/1997 | Briscoe et al. | 707/2 |
| 5,721,912 | 2/1998 | Stepczyk et al. | 707/102 |
| 5,721,913 | 2/1998 | Ackroff et al. | 707/103 |
| 5,724,574 | 3/1998 | Stratigos et al. | 707/10 |
| 5,729,730 | 3/1998 | Wlaschin et al. | 707/3 |
| 5,734,837 | 3/1998 | Flores et al. | 395/207 |

*Primary Examiner*—Thomas G. Black
*Assistant Examiner*—Frantz Coby
*Attorney, Agent, or Firm*—Gates & Cooper

[57] ABSTRACT

A computer-implemented task workflow management system is provided which includes a workflow engine. The workflow engine routes tasks in a predetermined task execution sequence to one or more workers. In addition, the workflow engine provides access to data and documents required by each worker to complete a particular task. A rule evaluator mechanism is operatively coupled to the workflow engine to evaluate a plurality of rules describing the predetermined task execution sequence such that the workflow management system is rule-based. An external program execution mechanism is operatively coupled to the rule evaluator mechanism to execute a program instruction external to the workflow management system such that functionality of the workflow management system can be extended beyond a core workflow management feature set in the workflow engine.

15 Claims, 2 Drawing Sheets

TASK WORKFLOW MANAGEMENT SYSTEM AND METHOD INCLUDING AN EXTERNAL PROGRAM EXECUTION FEATURE

CROSS-REFERENCE TO RELATED APPLICATIONS

This application is related to application Ser. No. 08/573, 310, entitled "'What If . . . 'Function For Simulating Operations Within a Task Workflow Management System," filed on same date herewith, by G. Goodridge et al., and assigned to the assignee of this application, which application is incorporated by reference herein.

BACKGROUND OF THE INVENTION

1. Field of the Invention

The present invention relates generally to task workflow management systems. More particularly, the present invention relates to such generally task workflow management systems which have a built-in external program execution feature.

2. Description of Related Art

In the past, computerized integrated office systems (IOS) products were introduced by many companies to boost productivity among white-collar workers. Companies implementing such systems typically realize two benefits: individual productivity increases, and communication between individuals and work groups is faster and more efficient.

Spreadsheets, word processors, and personal calendar applications are among the tools that increase individual productivity. Group services, such as electronic mail and electronic scheduling have accelerated and streamlined office communications. These activities have taken place in a common, multi-user environment. Since integrated office systems are usually host-based, these business systems typically run on minicomputers or mainframes.

During the 1980s, the growth of integrated office systems was challenged by advances in the personal computer (PC) industry. Personal productivity software tools developed for the PC were superior to those included with integrated office systems. These tools were easy to use, affordable, and diverse. PC software vendors were able to develop, introduce, and improve their products faster than their IOS competitors. Soon, PC-based software was the product of choice for businesses shopping for spreadsheet, word processing, or other personal productivity software packages. Inherent benefits associated with the PC platform (user friendliness, rapid screen refreshing, local disk storage, and others) cemented the PC's position in the workplace.

Despite their growing popularity, PCs still lagged behind integrated office systems in two important areas: communication and access to information. In the early years of PC development, individuals working on PCs could not share files, coordinate schedules, or communicate electronically, as people working in an IOS environment could. Local area network (LAN) products, which could connect between PCs for file exchange, electronic mail, and scheduling, emerged to address this deficiency. Small, independent workgroups began to form, often outside of the corporate Management Information Systems (MIS) department. Members of these workgroups either did the same type of work and needed to share or exchange information, or had complex communication requirements.

By using LANs to connect personal computers within workgroups, members of accounting departments, administrative groups, and small businesses could share files and communicate electronically. By the mid-1980s, it was common to find small decentralized workgroups creating, distributing, and storing information electronically using PCs connected by LANs.

Despite its convenience, the PC/LAN approach did little to automate the steps involved in executing and monitoring the work that takes place within or between workgroups. It will be appreciated by those skilled in the art that groupware-software for automating the process of people working together is one of the next important developments in the evolution of workplace automation.

Groupware products are defined within two categories: information-based groupware and transaction-based groupware. Information-based groupware is passive. It does not begin working until a user directs it to do so. Many widely used products belong to this category (e.g., basic electronic mail (E-mail)).

In contrast, transaction-based groupware is active. Workflow software systems are one such type of transaction-based groupware. Workflow systems handle system processing automatically by routing items and managing workflow based on rules set up by users. This type of groupware is particularly effective when used in a data processing system where electronic documents, rather than paper documents, can be passed from one processing step to the next.

Workflow systems often include a core set of features. A need exists for these workflow systems to add additional functionality beyond this core set. In addition, many data processing sites have existing software systems installed which perform various tasks (e.g., data base management).

It can be seen that there is a need for a way to adapt workflow systems to the particular data processing site by integrating the workflow systems with these existing software systems.

SUMMARY OF THE INVENTION

To overcome the limitations in the prior art described above, and to overcome other limitations that will become apparent upon reading and understanding the present specification, the present invention discloses a transaction-based groupware generally known as workflow management systems which handle system processing by automatically routing items and managing workflow based on a set of user-defined rules.

In accordance with one aspect of the invention, a computer-implemented task workflow management system is provided which includes a workflow engine. The workflow engine routes tasks in a predetermined task execution sequence to one or more workers. In addition, the workflow engine provides access to data and documents required by each worker to complete a particular task. An external program execution mechanism is operatively coupled to the workflow engine to execute a program instruction external to the workflow management system such that functionality of the workflow management system can be extended beyond a core workflow management feature set in the workflow engine.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Several workflow management (WFM) systems exist. Many WFM systems are based on a client/server architecture designed for maximum portability across operating systems and data base management system (DBMS) platforms. WFM systems typically manage the routing, queuing, and tracking of work or tasks. In addition, WFM systems may define computer-based work steps or tasks, workflow data management, and the user interface, but these parts of the WFM system may be left to system integrators to develop.

Figure 1:
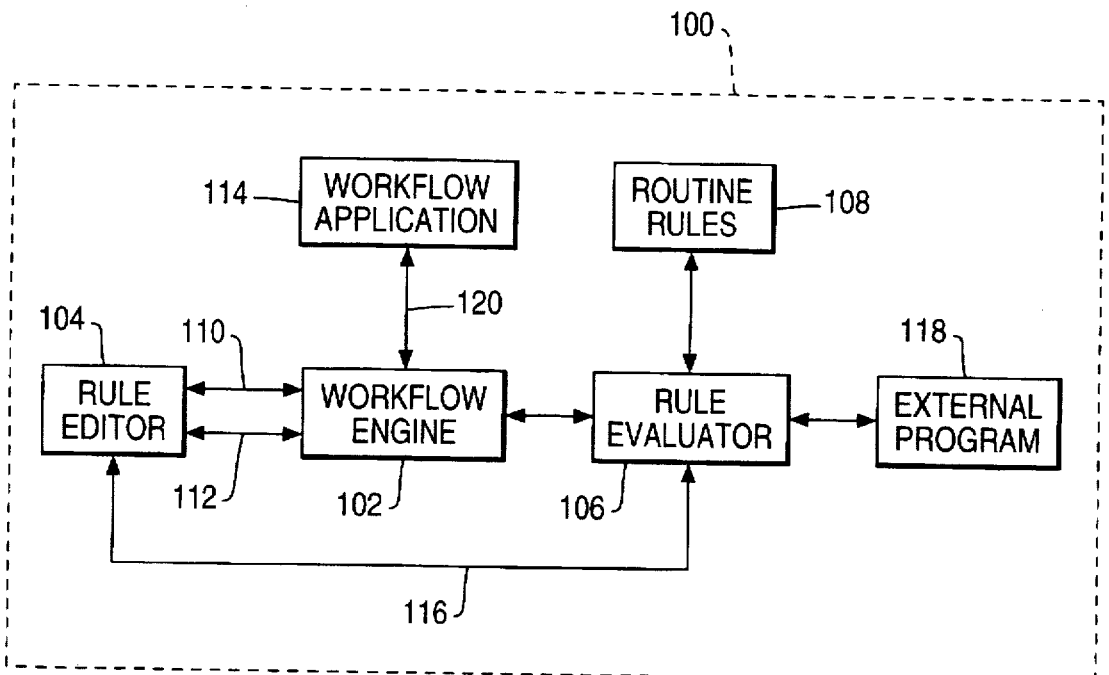
FIG. 1 is a block diagram of the preferred embodiment workflow management (WFM) system in accordance with the present invention.

Referring now to FIG. 1, a block diagram of the preferred embodiment WFM system 100 in accordance with the present invention (also known as ProcessIT™ from AT&T Global Information Solutions) is shown.

The WFM system 100 is a client/server groupware product for developing, executing, and managing automated process paths within an enterprise. To understand how the WFM system 100 automates workplace procedures, imagine that your company has hired a firm, Mercury Inc., to manage your work routing procedures. Mercury supplies couriers who have memorized all office procedures, both formal and informal. The procedures are presented in a process map format, which is a graphical representation of the workflow as defined by the business process owner. Mercury can provide an unlimited number of couriers to follow these process maps.

The Mercury courier follows the process map from one step to the next, carrying work items or data references. In a mortgage loan processing cycle, couriers direct the routing of loan applications, credit reports, and income summaries for an applicant to the loan officer, to credit approval agents, and to others through the approval cycle. For insurance claim processing, couriers follow the process maps through the data entry step, to the verification or suspense step, then to the benefits and payment steps, and finally to the archival step.

Changing procedures is simple, because all Mercury couriers take instructions easily and change procedures as directed. If two people need to review the same document, Mercury couriers make copies for each person simultaneously. Slowdowns are rare, because Mercury monitors work levels and distributes work among qualified individuals. Mercury couriers concentrate on routing work, allowing your employees to focus on processing the work, not routing it.

The WFM system 100 is an electronic Mercury. It is an application coordinator, governing the flow of work between applications and electronic data files so that they work together logically and harmoniously. The WFM system's 100 main function is to guarantee that data follows the logical processing steps defined by the organization.

The WFM system 100 connects information processing centers within an enterprise by electronically routing work along the process paths defined by the business process owner. Images, data, objects, messages, and combinations of these are all regarded by the WFM system 100 as work to be routed along prescribed processing paths.

The WFM system 100 preferably is a rule-based routing product. It offers users the ability to capture and execute organization-specific policy rules in order to determine the path of a work item ("courier") in a process map. The WFM system 100 generates routes for a courier by accessing application data associated with the courier and interpreting the user-supplied policy rules in this context.

A WFM system 100 courier travels between the nodes ("activities") of a directed graph ("map") via edges labeled with "return states". The rule-based routing WFM system 100, via a graphical user interface (GUI), allows a system administrator to specify a way to compute a return state at run-time using a language of conditional expressions composed of variables, constants, and operators. Such rule-based systems are very flexible, because values of the variables in the rules can be readily changed.

Figure 2:
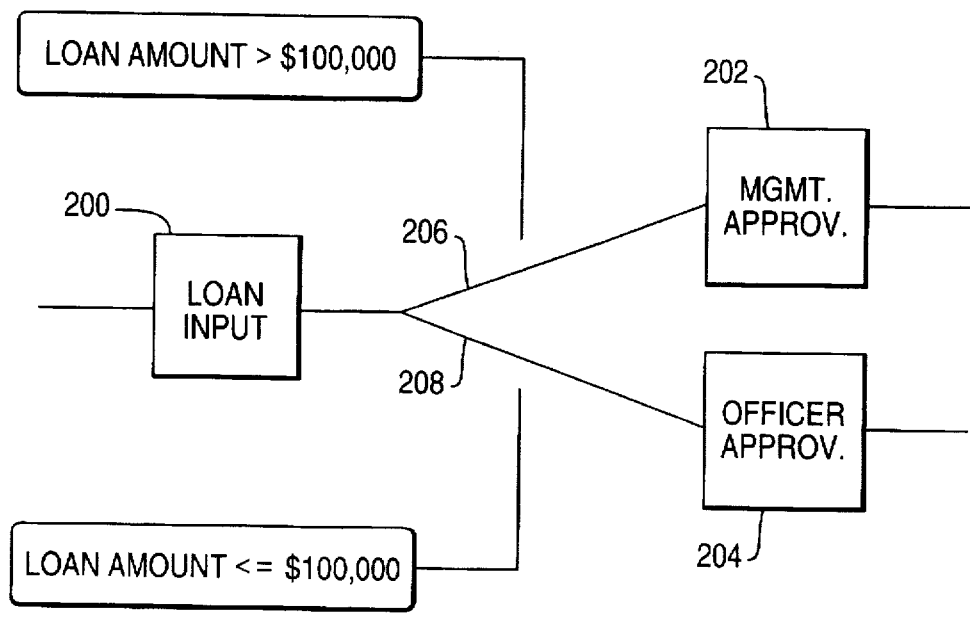
FIG. 2 is a block diagram of an example rule which could be implemented in the WFM system shown in FIG. 1.

In the FIG. 2, a system administrator has specified that loans 200 in excess of $100,000 should be routed to MgmtApprov 202; otherwise, they should be routed to OfficerApprov 204. The system administrator can modify the $100,000 threshold "on-the-fly" without changing any of the application software.

The return state (i.e., the edges or arcs 206 and 208 in this example) may be computed automatically by user-written software (with or without any user input). This enforces organizational policy to determine the routing of work items. However, users must engineer and maintain this solution themselves. Users may be unable to completely separate the routing functionality from their application software since they cannot incorporate the routing logic into the WFM system 100 to yield a general solution.

The difficulty of using automatic routing support can be alleviated by the implementation of several concepts as additional features. These concepts/features include:

Abstraction—separating the application from the process. The routing software removes the routing mechanism from the user's software. This allows users to change routing instructions without necessarily requiring changes to a user's application (and vice versa).

Accessibility—sophisticated routing capabilities can be accessed directly by users which means that users are freed from having to engineer and maintain their own inferencing software. Users can focus their attention on the business meaning of the process rather than on the implementation mechanics of the process. This encourages more effective use of WFM system 100 in business processes.

Context Sensitivity—the routing software includes an interface for communicating instance-specific information to the rule evaluator 106. This information enables the rule evaluator 106 to more intelligently make decisions about the disposition of work in a user's business process.

The automatic routing support preferably is enabled by the use of four software modules: a rule editor 104, a rule application programming interface (API) 110, a variable API 112, and a rule evaluator 106. The rule editor 104 has a GUI through which a customer defines routing rules 108. The rule editor 104 communicates with the workflow engine 102 via the rule API 110 and the variable API 112. The rule evaluator 106 interprets the user-defined rules 108 and routes work items (i.e., tasks), accordingly. The rule evaluator 106 contains an interpreter which understands rules written in a preferred embodiment rule language.

In addition to these software modules, the automatic routing support interacts with a process activity manager (pam) and the pam's underlying database residing in the workflow engine 102 as well as with the user's application 114.

A system administrator uses the rule editor 104 from a client to create new routing rules 108 or to inspect/modify/delete existing routing rules 108. The administrator can test routing rules before they take effect in a business application 114 by providing values for rule variables and then directly submitting the rule to the server rule evaluator 106 from the rule editor 104. This direct submission may be accomplished through a direct connection 116 or a virtual connection which passes unchanged through the workflow engine 102. In either case, this allows the administrator to debug rule syntax and semantics without having to have any test rules run by the workflow engine 102 or the workflow application 114.

Routing rules 108 and variables preferably are stored in a database embedded in the WFM system 100. This database may also be used by other parts of the WFM system 100. Global variables (accessible system-wide to all applications) are normally given values by the administrator through a variable editor (not shown) which may have a GUI which is similar to and may run on the same client as the rule editor 104. Courier instance variables (reflecting data specific to an individual task courier) are set by the workflow application 114 using variable API 120 calls.

When a user returns a courier to a WFM activity, the rule evaluator 106 determines if a routing rule 108 has been defined for this activity. If a rule has been associated with the activity, the rule evaluator 106 interprets the rule (using an internal parser) in the context of any variables stored in the relational database and generates a return state for the courier. Otherwise, routing is accomplished using other existing workflow engine 102 functionality.

The preferred embodiment rule language is modeled after the "if" part of "if-then" statements. The following Table 1 lists the names of the operators and the symbols by which they are represented in this preferred embodiment rule language. It will be appreciated by those skilled in the art that other operators and/or symbols could be used without departing from the scope and spirit of the present invention.

TABLE 1

| Arithmetic | | |
|---|---|---|
| | Exponentiation | ^ |
| | Negation | − |
| | Multiplication and division | *, / |
| | Integer division | \ |
| | Modulo arithmetic | Mod |
| | Addition and subtraction | +, − |
| String | | |
| | Concatenation | & |

TABLE 1-continued

| Comparison | | |
|---|---|---|
| | Equality | = |
| | Inequality | <> |
| | Less than | < |
| | Greater than | > |
| | Less than or Equal to | <= |
| | Greater than or Equal to | >= |
| | Pattern Matching | Like |
| Logical/Bit-wise | | |
| | Not | Not |
| | And | And |
| | Or | Or |
| | Exclusive Or | Xor |
| | Equivalence | Eqv |
| | Implies | Imp |

The Comparison operators return either True (−1) or False (0) as a result. True and False may be referred to by name or by their integer values of −1 and 0, respectively. With these values for True and False, logical operators and bit-wise operators are equivalent.

Most of the operators are commonly known and have their usual meaning. Xor represents "Exclusive Or". Eqv presents "Equivalence", which is the complement of Xor. Imp represents "Implies". A Imp B is False if and only if A is True and B is False.

The "Like" comparison operator compares the string expression on the left side with a pattern on the right side. If the string matches the pattern, the result is True; otherwise, "Like" evaluates to False. All string comparisons are case sensitive, binary comparisons. The pattern can contain the wildcard characters *, ?, and #. ? matches any single character in the string; * matches zero or more characters; # matches any single digit (0–9). The wildcard characters *, ?, and #, as well as the left bracket [, can be used to match themselves directly by enclosing them in brackets [ ].

The rule language also includes some functions. One function in the rule language is the "Now" function which is provided to allow a rule to get the current date and time from the WFM system 100. This function takes no parameters and returns data of date/time type. The "Now" function can be specified with or without the trailing parentheses (i.e., now is the same as now()).

Another function is the "Run" function which is provided to invoke an external user-supplied program 118 on the server which also runs the WFM system 100. The "Run" function allows the user to extend the environment in which clauses are evaluated to include, for example, external databases. The preferred embodiment syntax for the "Run" function is:

Run (prog [, arg1 [, arg2 [. . .]]])

Each parameter to the "Run" function can be any expression. As with any expression, all literal strings must be enclosed with double-quotes. The rule evaluator 106 evaluates the expression arguments before invoking the external program 118. The return value of the "Run" function is a data value of character type. In the preferred embodiment, this return value is equivalent to the first 127 bytes sent to standard out (stdout) from prog in a UNIX-based server application. It will be appreciated that the return value may be of different length or come from a different source in other implementations of the WFM system 100.

In the preferred embodiment, the command string executed by the "Run" function is evaluated in a different UNIX process from the Process Activity Manager "pam" or workflow engine 102. This insulates "pam" from errors in the customer's program which might otherwise cause "pam" to crash. By having separate processes, the execution of "Run" function can be said to be isolated from the workflow engine 102. This also means that if the user's program wishes to access rule evaluator 106 functionality, it needs to separately login to the rule evaluator 106 as another client application.

A parameter or configuration file on the server preferably contains the parameter, Max_Run_Response_Time, under the category [Rule_Configuration]. If the program does not exit in the time frame specified by this parameter in seconds, the rule evaluator 106 notifies the program 118 to stop. In UNIX V.4 implementations, this is handled by sending the signal SIGINT, and then treating the rule as if it encountered an error in the rule by returning an error statement. It will be up to the called program to process the SIGINT signal, unwinding any side affects as it sees fit. If the called program chooses to ignore the SIGINT signal, the program will continue to run to completion and its return value will be ignored by the "pam" or workflow engine 102. If the program is hung and ignores the SIGINT signal, it will be up to the system administrator to terminate the process from UNIX. Other server operating systems (e.g., Microsoft Windows NT™) may have a somewhat different mechanism for terminating programs. The appropriate implementation choices will be made for these operating systems.

The first argument to a "Run" function may be a compiled UNIX executable program, a UNIX shell script, or a built-in UNIX shell command. However, when directly executing UNIX shell commands, care should be taken especially when executing destructive commands such as "rm".

Shell scripts preferably are interpreted by the "Run" function using the Bourne shell sh(1). To specify a different interpreter, the shell command is provided as the first argument to the "Run" function which is then passed as a parameter to the shell script, as in:

Run ("ksh", "myscript", "arg1", "arg2")

The "Run" function will not fail as long as the first argument to the function can be run. In the above example, if the script "myscript" is not found by the Korn Shell, "ksh" prints an error string to stderr but nothing to stdout. This blank string would be interpreted by the rule evaluator 106 as being the value returned from the successful execution of "Run", regardless of the fact that "myscript" never ran at all. If "myscript" had instead been invoked in the default Bourne shell by:

Run ("myscript", "arg1", "arg2")

The "Run" function would return an error statement if "myscript" could not be found.

When evaluating a rule, each call to a "Run" function assigns the returned value to a system generated character type variable from the sequence _Run1, _Run2, .... These system generated variables can be used in other clauses in the same rule to refer to the results of calls to the "Run" function. This eliminates the need to invoke the same external program 118 more than once if its value is needed in several clauses within a rule.

In addition, a system generated integer type variable from the sequence _Err1, _Err2, ... holds the lower order 8 bits of the value returned by the invoked program through a call to the function exit(). These values are, therefore, between −128 and 127.

This preferred embodiment can be summarized in reference to FIG. 1 as a computer-implemented rule-based task workflow management system 100. A workflow engine 102 routes tasks in a predetermined task execution sequence to a plurality of workers according to a plurality of rules. The workflow engine 102 also provides access to data and documents required by each worker to complete a particular task. In addition, the workflow engine 102 tracks aspects of worker performance of the tasks in the predetermined task execution sequence.

A rule evaluator 106 is operatively coupled to the workflow engine 102 for evaluating the plurality of rules and providing instructions to the workflow engine 102 on routing the tasks in the predetermined task execution sequence.

A rule editor 104 may be operatively coupled to the workflow engine 102 for editing the plurality of rules.

An external program execution mechanism 118 is operatively coupled to the rule evaluator 106 for executing a program instruction external to the workflow management system 100 such that functionality of the workflow management system can be extended beyond a core workflow management feature set in the workflow engine 102. The program instruction may be associated with another computer-based system (e.g., a data base in which a query could be performed to: check a user's password, check on the status of equipment used to route tasks, or get other information needed by the WFM system 100).

The external program execution mechanism 118 may execute the program instruction in an operating system process isolated from an operating system process associated with the workflow engine 102 so that any errors occurring in the external program instruction execution are isolated from the main workflow engine 102 process.

The plurality of rules preferably are derived from a rule language which includes a "Run" function. The "Run" function executes in the rule evaluator 106 such that it causes the external program execution mechanism 118 to execute the external program instruction and return data generated by execution of the external program instruction to the rule evaluator 106 as a result string. The rule evaluator 106 then evaluates subsequent rules based on the returned result string.

The plurality of rules preferably comprise "if" clauses having an antecedent and a consequent portion. The "Run" function is located in either the antecedent or consequent portions of the "if" clause.

Figure 3:
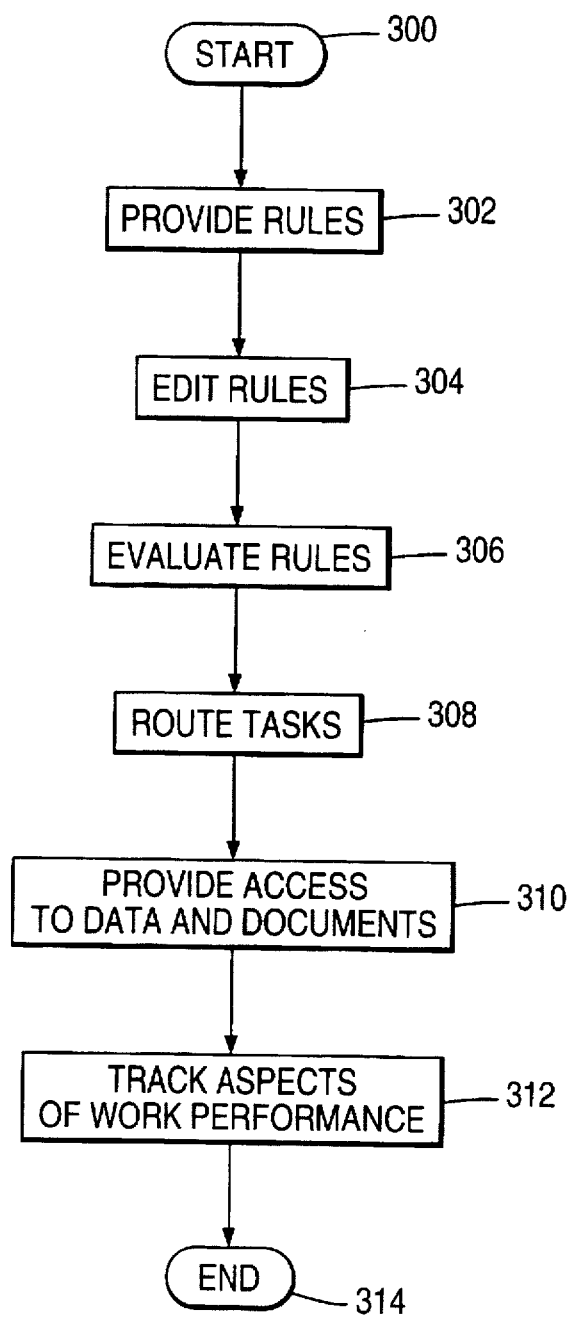
FIG. 3 is a flowchart of a method of operation of the WFM system shown in FIG. 1 in accordance with the present invention.

This preferred embodiment may also be described in reference to computer-implemented method steps 300–314 of rule-based task workflow management shown in FIG. 3 which detail preferred embodiment operations of the WFM system 100 as shown in FIG. 1. This method includes the steps of providing 302 one or more rules. These rules may be edited 304 at any time. In addition, these rules are derived from a rule language which includes a "Run" function located within "if" clauses having an antecedent and a consequent portion. The "Run" function is located in either the antecedent or consequent portions of the "if" clause. The "Run" function executes a program instruction external to a workflow management system 100 and returns data generated by execution of the external program instruction as a result string such that subsequent rules can be evaluated based on the returned result string. The program instruction may be associated with another computer-based system.

The rules are evaluated 306 and tasks are routed 308 in a predetermined task execution sequence to one or more workers according to the rules. In the preferred embodiment, execution of rules including the "Run" function is accomplished in an operating system process isolated from an operating system process associated with the routing tasks in the predetermined task execution sequence. Access is provided 310 to data and documents required by each worker to complete a particular task. Also, aspects of worker performance of the tasks in the predetermined task execution sequence is tracked 312.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto. For example, the preferred embodiment WFM system was described in reference to a UNIX based client/server system. It will be appreciated by those skilled in the art that this system can be configured for use on computer systems which utilize other multitasking operating systems such as Microsoft Windows NT™ without departing from the scope and spirit of the present invention.

What is claimed is:

1. A computer-implemented task workflow management system, comprising:
   (a) a workflow engine executed by a first computer based system for routing tasks in a predetermined task execution sequence to a plurality of workers and providing access to data and documents required by each worker to complete a particular task;
   (b) a rule evaluator, operatively coupled to the workflow engine, for evaluating a plurality of rules describing the predetermined task execution sequence such that the workflow management system is rule-based;
   (c) external program execution means, executed by a second computer based system, operatively coupled to the rule evaluator, for executing a program instruction external to the workflow management system, such that functionality of the workflow management system can be extended beyond a core workflow management feature set in the workflow engine; and
   (d) wherein the plurality of rules are derived from a rule language which includes a function comprising means for causing the external program execution means to execute the external program instruction and return data generated by execution of the external program instruction to the rule evaluator means as a result string such that the rule evaluator means can evaluate current and subsequent clauses in the rules based on the returned result string.

2. The task workflow management system of claim 1 wherein the workflow engine comprises means for tracking aspects of worker performance of the tasks in the predetermined task execution sequence.

3. The task workflow management system of claim 1 wherein the program instruction comprises a database query function.

4. The task workflow management system of claim 1 wherein the second computer based system comprises an operating system process that is isolated from the first computer based system that comprises an operating system process associated with the workflow engine.

5. The task workflow management system of claim 1 wherein the plurality of rules are derived from a rule language which includes a "Run" function, wherein the "Run" function comprises means for causing the external program execution means to execute the external program instruction and return data generated by execution of the external program instruction to the rule evaluator means as a result string such that the rule evaluator means can evaluate current and subsequent clauses in the rules based on the returned result string.

6. The task workflow management system of claim 5 wherein the plurality of rules comprise "if" clauses having an antecedent portion and a consequent portion, the "Run" function being located in one of the portions.

7. The task workflow management system of claim 1 further comprising a rule editor means, operatively coupled to the workflow engine, for editing the plurality of rules.

8. A computer-implemented method of rule-based task workflow management, comprising the steps of:
   (a) providing a plurality of rules, the plurality of rules being derived from a rule language which includes a "Run" function, the "Run" function executing a program instruction external to a workflow management system, wherein the workflow management system is executed by a first computer based system and the program instruction is executed in a second computer based system, and returning data generated by execution of the external program instruction as a result string such that current and subsequent clauses of the rules can be evaluated based on the returned result string;
   (b) evaluating the plurality of rules and routing tasks in a predetermined task execution sequence to a plurality of workers according to the plurality of rules;
   (c) providing access to data and documents required by each worker to complete a particular task; and
   (d) tracking aspects of worker performance of the tasks in the predetermined task execution sequence.

9. The method of claim 8 wherein the step of evaluating the plurality of rules and routing tasks in the predetermined task execution sequence comprises executing rules including the "Run" function in an operating system process isolated from an operating system process associated with the routing tasks in the predetermined task execution sequence.

10. The method of claim 8 wherein the plurality of rules comprise "if" clauses having an antecedent and a consequent portion, the "Run" function being located in one of the "if" clause portions.

11. The method of claim 8 further comprising the step of editing the plurality of rules.

12. A program storage device, readable by a computer, tangibly embodying a program of instructions executable by the computer to perform method steps for performing rule-based task workflow management in a computer having a memory, the method comprising the steps of:
   (a) providing a plurality of rules, the plurality of rules being derived from a rule language which includes a "Run" function, the "Run" function executing a program instruction external to a workflow management system, wherein the workflow management system is executed in a first computer based system and the program instruction is executed in a second computer based system, and returning data generated by execution of the external program instruction as a result string such that current and subsequent clauses of the rules can be evaluated based on the returned result string;
   (b) evaluating the plurality of rules and routing tasks in a predetermined task execution sequence to a plurality of workers according to the plurality of rules;

(c) providing access to data and documents required by each worker to complete a particular task; and (d) tracking aspects of worker performance of the tasks in the predetermined task execution sequence.

13. The program storage device of claim 12 wherein the step of evaluating the plurality of rules and routing tasks in the predetermined task execution sequence comprises executing rules including the "Run" function in an operating system process isolated from an operating system process associated with the routing tasks in the predetermined task execution sequence.

14. The program storage device of claim 12 wherein the plurality of rules comprise "if" clauses having an antecedent and a consequent portion, the "Run" function being located in one of the "if" clause portions.

15. The program storage device of claim 12 further comprising the step of editing the plurality of rules.

* * * * *